United States Patent [19]

Birkestrand

[11] Patent Number: 5,197,362
[45] Date of Patent: Mar. 30, 1993

[54] TUBE AND ROD END SHAPING AND FINISHING MACHINE

[76] Inventor: Orville J. Birkestrand, 2705 Lee Ave., El Monte, Calif. 91733

[21] Appl. No.: 616,963

[22] Filed: Nov. 21, 1990

[51] Int. Cl.⁵ .............................................. B23B 5/16
[52] U.S. Cl. .................................. 82/113; 82/153; 408/135
[58] Field of Search ..................... 82/112, 128, 153; 408/111, 135

[56] References Cited

U.S. PATENT DOCUMENTS

| | | | |
|---|---|---|---|
| 1,526,950 | 2/1925 | Bartley | 82/128 |
| 4,364,290 | 12/1982 | Astle | 82/113 X |
| 4,622,873 | 11/1986 | Przybylski, Sr. | 408/135 X |
| 4,655,108 | 4/1987 | Galos | 82/113 X |
| 4,739,682 | 4/1988 | Birkestrand | 82/113 |
| 4,854,200 | 8/1989 | Mynhier | 82/113 X |

*Primary Examiner*—Steven C. Bishop
*Attorney, Agent, or Firm*—Wagner & Middlebrook

[57] ABSTRACT

A tube and rod shaping and finishing machine is adapted to employ a plurality of tools to machine a workpiece in a single operation by employing a spindle mounted tool cartridge mounted for extending axial travel on a support shaft which also serves as a stock stop.

3 Claims, 6 Drawing Sheets

TUBE AND ROD END SHAPING AND FINISHING MACHINE

BACKGROUND OF THE INVENTION

The present invention relates to metal working machines and more particularly to improvements in tube and rod end shaping and finishing machines.

In metal working it frequently is necessary to finish the ends of tubes or rods by deburring, chamferring, flaring and the like, and many types of machines, both bench or floor mounted and portable have been developed for such purposes as described in my U.S. Pat. No. 4,739,682 issued Apr. 26, 1988, to which reference should be made for a description of structural detail of the machine in which the improvements of the present invention are incorporated.

In addition to effecting such finishing operations on the ends of tube or rod stock, it frequently is necessary to shape the end portions of such stock for some distance beyond its end, and it is the primary object of the present invention to adapt the machine of the aforesaid patent to effect such shaping operations.

BRIEF DESCRIPTION OF THE INVENTION

According to the present invention a metal working machine is provided which has all of the advantages of the machine disclosed in my earlier patent identified above, but which also is capable of shaping the end of rod or tube stock for a distance beyond the ends thereof determined by a stock stop. For this purpose, the machine of the present invention embodies, in addition to such a stock stop, improved means for effecting axial feeding of metal working tooling against a workpiece clamped in the machine.

BRIEF DESCRIPTION OF THE DRAWING

This invention may be more clearly understood from the following detailed description and by reference to the drawing in which.

DETAILED DESCRIPTION OF THE INVENTION

Figure 1:
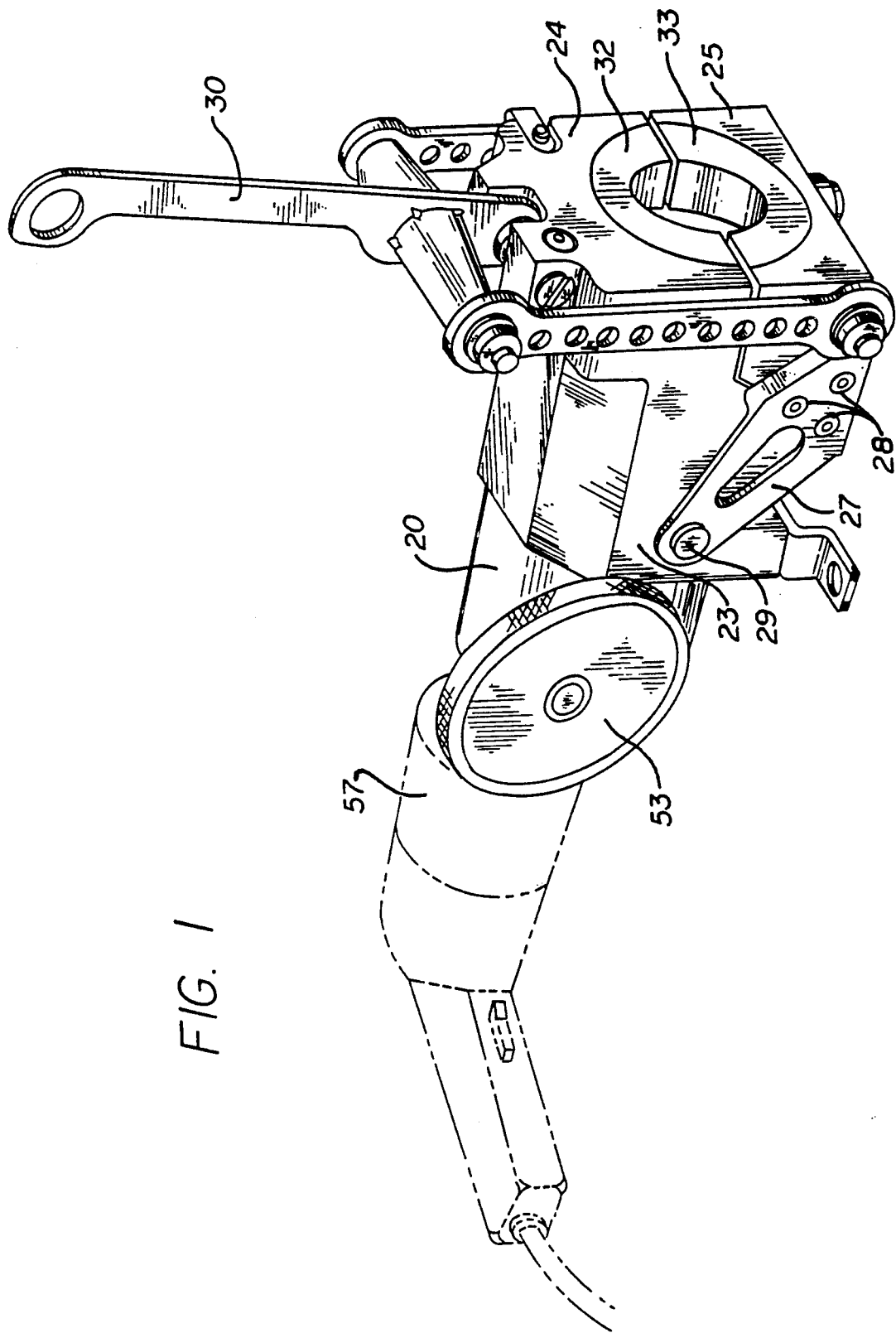
FIG. 1 is a view in perspective of a tube and rod end shaping and finishing machine embodying the present invention.

As shown in FIG. 1 of the accompanying drawing, the machine of the present invention comprises a housing 20, generally tubular in shape, having a forward portion 21 carrying tool holding means and a rearward portion 22 to which motor driving means may be attached.

At the forward end of the housing 20 is a clamshell workholder assembly 23 the upper jaw 24 of which is integral with the housing 20 and the lower jaw 25 of which is pivotally mounted on the housing 20 by a swing bracket 27 secured to the lower jaw 25 by means such as screws 28 and pivoted to the housing 20 at 29; the axis of the pivot 29 being normal to the longitudinal axis of the housing 20 and intersecting the axis of the spindle 50, described hereinafter, which is disposed centrally of the housing 20.

Figure 2:
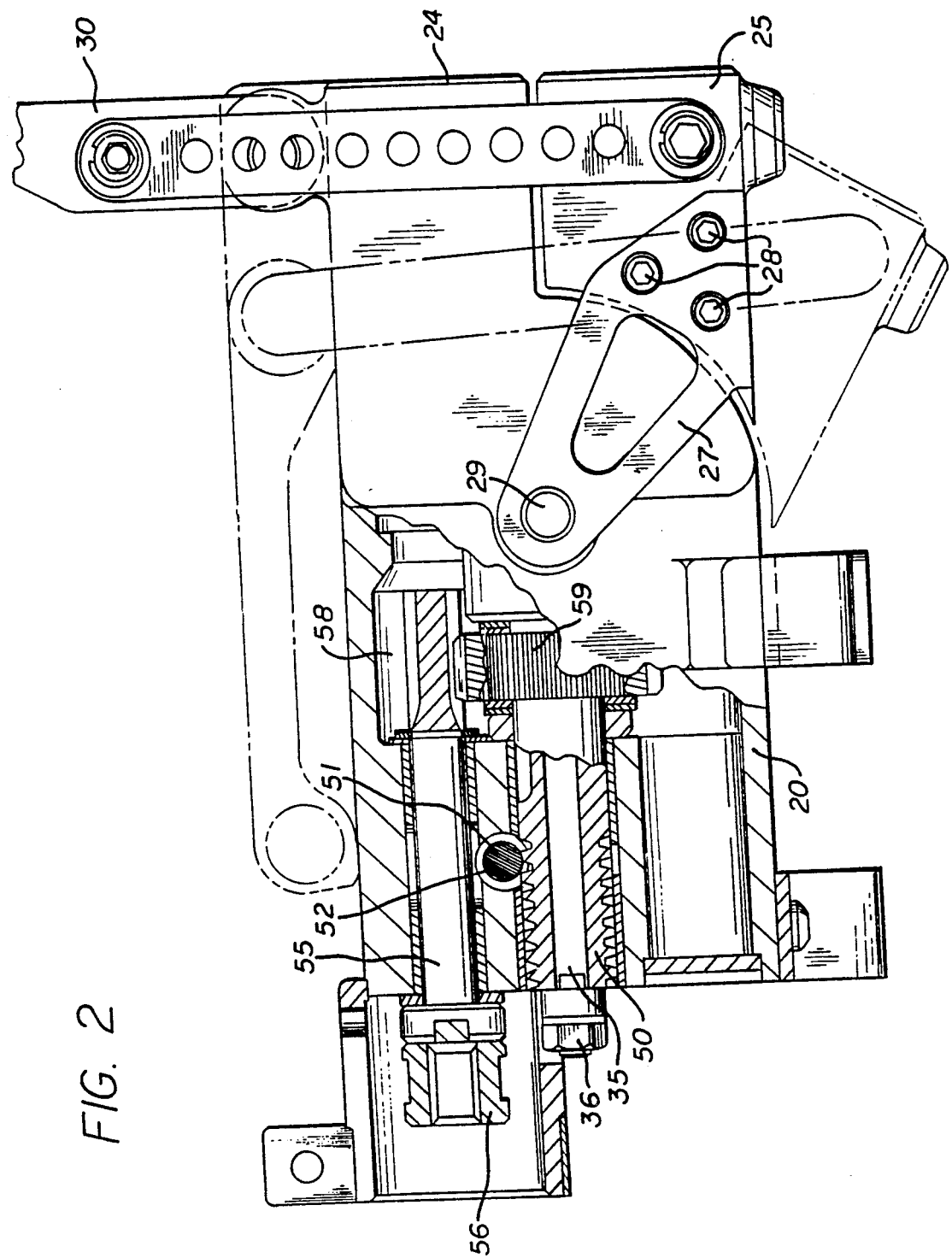
FIG. 2 is a view in side elevation, partly in section, illustrating the spindle feed and drive mechanisms.
Figure 3:
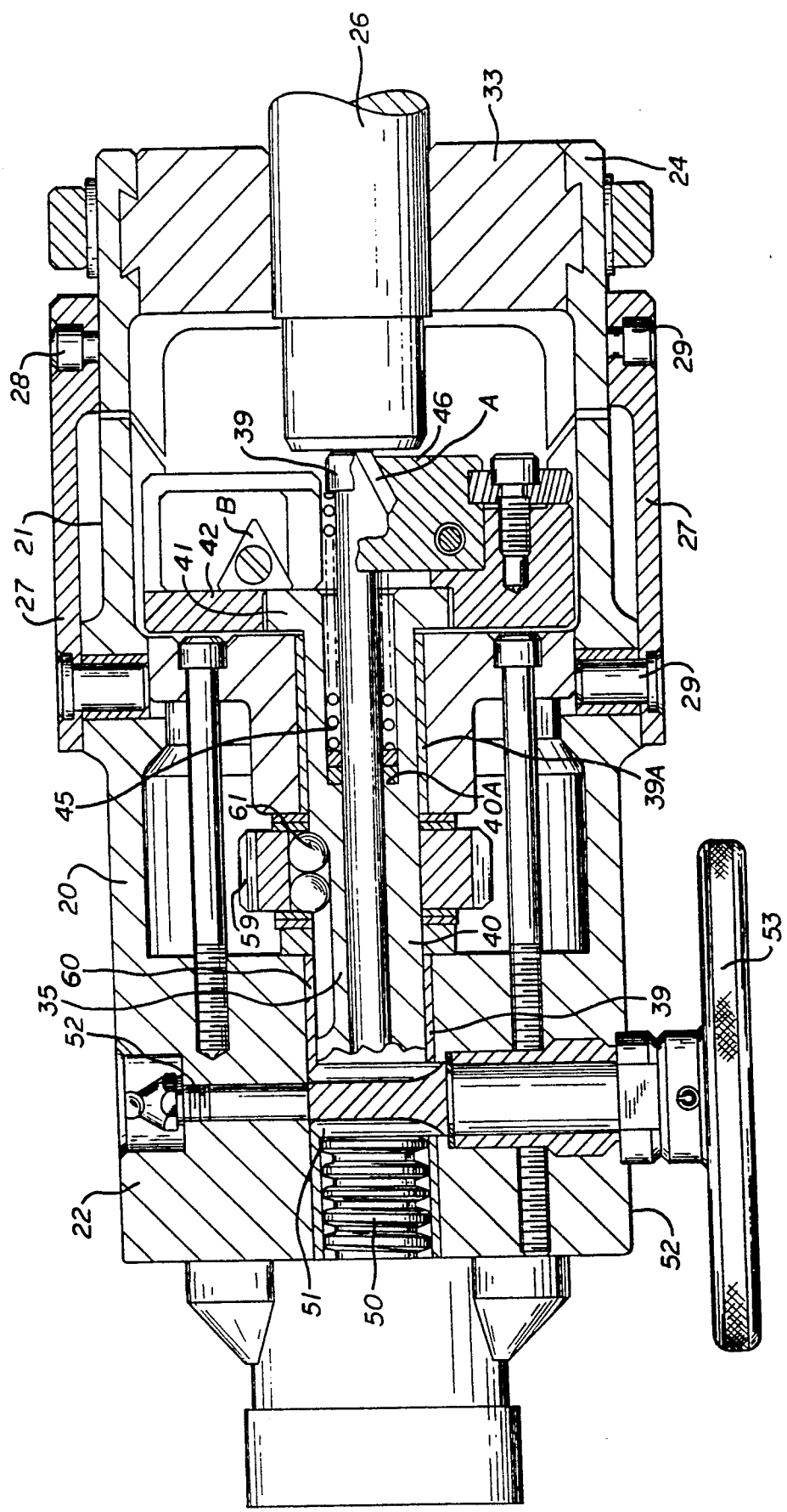
FIG. 3 is a view in plan and partly in section illustrating the spindle feed and drive mechanisms.
Figure 4:
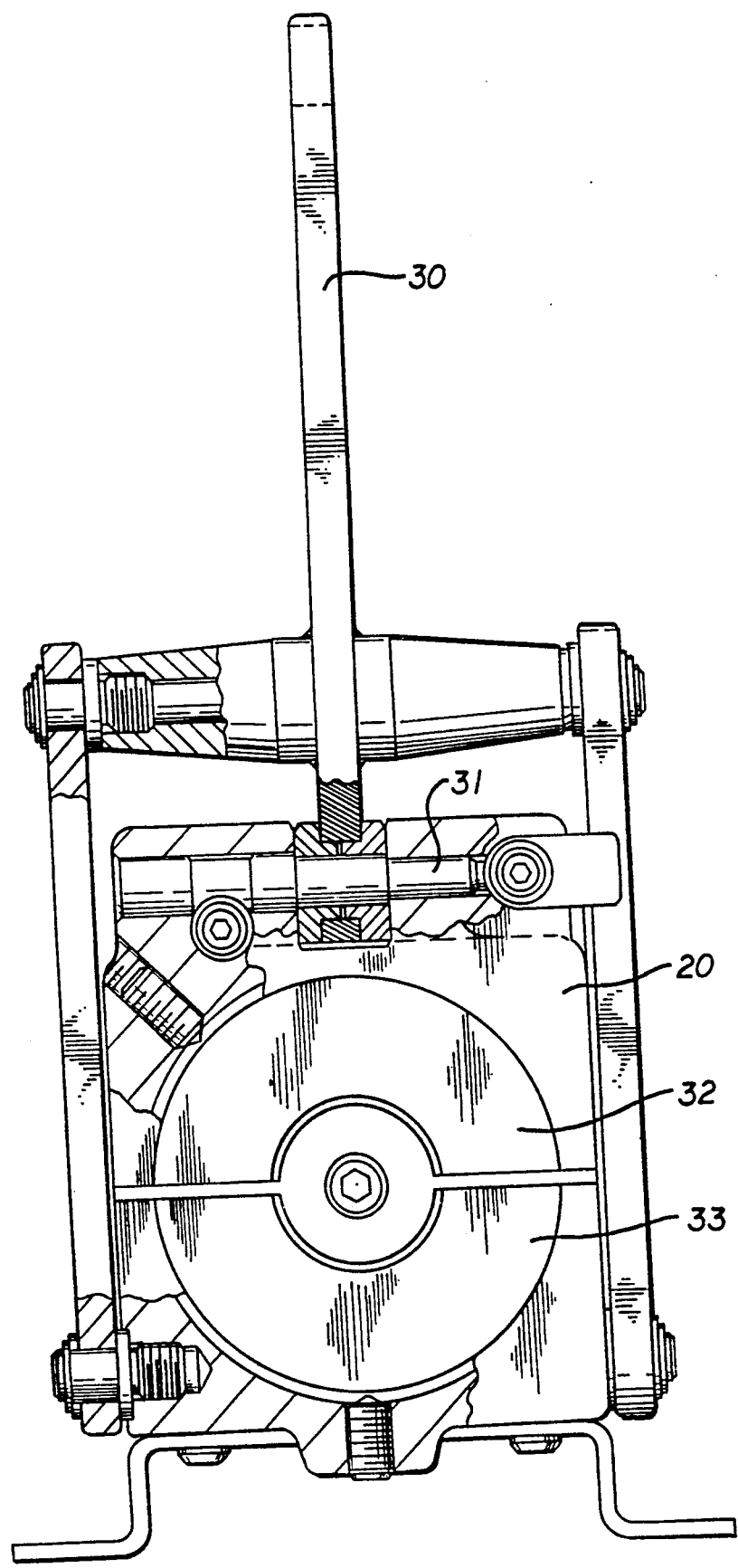
FIG. 4 is a view in front elevation and partly in section of the machine of FIG. 1.

Movement of the lower jaw 25 in an arcuate path toward the position shown in FIGS. 3 and 4 in which it clamps a workpiece 26 in position for machining and away from that position to the open position of the clamshell in which it is shown in FIG. 2, is accomplished as described in detail in the aforesaid patent.

As shown in FIGS. 1, 2 and 4, a jaw operating lever 30 is pivoted at its lower end on a pin 31 (FIG. 4) as described in detail in said patent, and as also described therein each of the jaws 24 and 25 is adapted to receive dies 32 and 33 of various internal diameters so that workpieces of various diameters may be clamped between the jaws.

Figure 5:
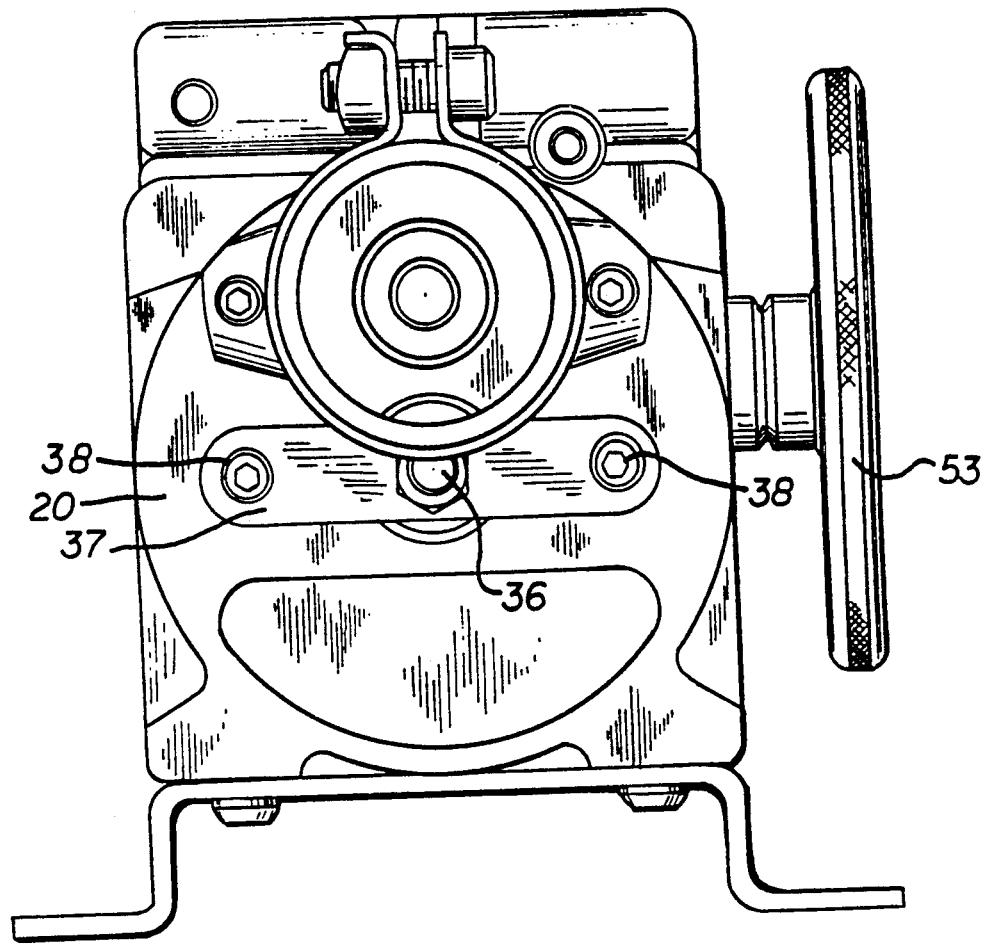
FIG. 5 is a view in rear elevation of the machine of FIG. 1.

A spring retaining bolt and stop 35 which extends axially within the tubular housing 20 is threaded at one end and secured by a nut 36 of FIG. 5 to a support bracket 37 which, in turn, is fixed to housing 20 by screws 38. At its opposite end the shaft 35 is provided with an enlarged head 39 which, as explained hereinafter, functions as stock stop in positioning a workpiece with respect to metal working tooling.

A tubular spindle 40 is journaled in sleeve bearings 39 and 39A and encircling bolt 35 for rotation and axial movement with respect thereto, and has a flanged end 41 (FIG. 3) to which a cutter cartridge assembly 42 is attached. A compression spring 45 is disposed between the head 39 of the bolt 35 and an abutment internal shoulder 40A of the spindle 40 which normally maintains the spindle 40 and assembly 42 retracted from engagement with a workpiece held by the clamshell workholder 23.

Figure 6:
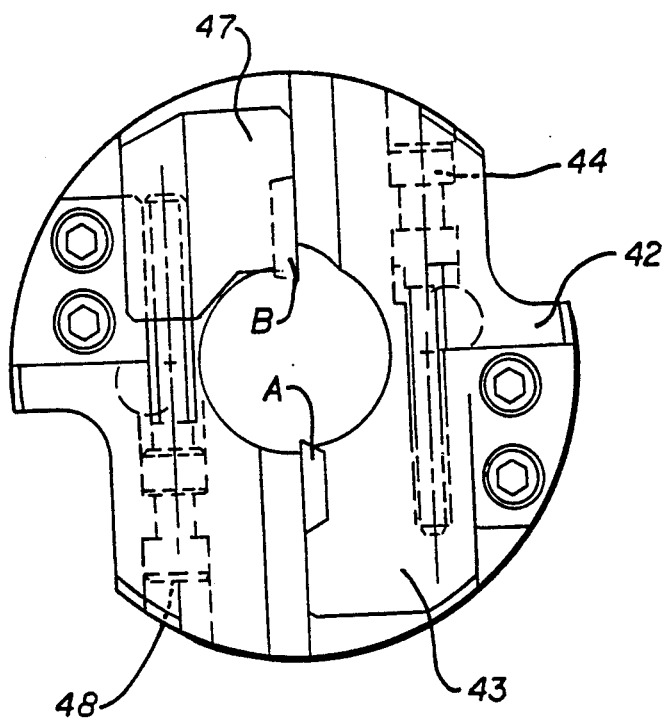
FIG. 6 is a view in front elevation of the tool cartridge assembly of the machine of FIG. 1.
Figure 7:
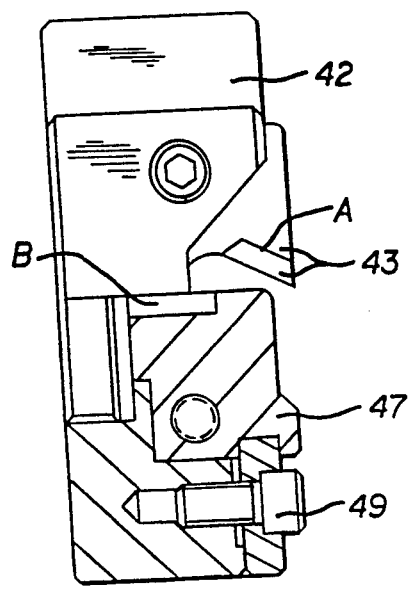
FIG. 7 is a view in section of the assembly of FIG. 6 taken on the line 7—7 of FIG. 6.
Figure 8:
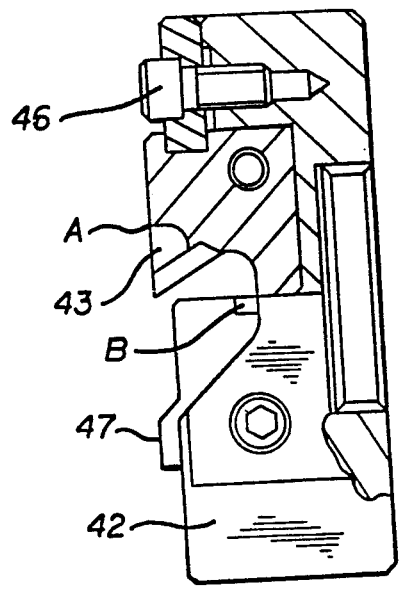
FIG. 8 is a view in section of the assembly of FIG. 6 taken on the line 8—8 of FIG. 6.

As shown in FIGS. 6, 7 and 8 the cutter cartridge assembly 42 includes a plurality of metal working tools such as a turning tool 43 which is adjustably mounted in the assembly 42 by means of an adjusting screw 44 rotation of which effects radial adjustment of the tool 43, and clamping screw 46 rotation of which clamps the tool in adjusted position. Similarly a chamfering tool 47 is adjustably mounted in the assembly 42 by means of an adjusting screw 48 and a clamping screw 49.

Manually operable means are provided for feeding the spindle 40 and the cutter cartridge assembly 42 secured to it axially within the housing 20 so as to advance the assembly 42 into engagement with a workpiece held by the clamshell workholder 23. For this purpose, the end of the spindle 40 remote from the cutter cartridge assembly is made in the form of a cylindrical rack 50. A pinion 51 carried by a rotatable shaft 52 journalled in housing 20 and extending normal to the spindle 40, meshes with the rack 50 while permitting rotation of spindle 40 with respect to the pinion 51, but functions upon rotation of shaft 52, as by handwheel 53, to feed the spindle 40 axially in either direction.

Means are provided for effecting powered rotation of the spindle and cutter cartridge assembly in any axially displaced positioning thereof with respect to the housing. The cartridge assembly mounts a plurality of cutters, for example, turning cutter A and chamfering cutter B. For this purpose there is journalled in the housing 20, parallel to the spindle 40, a drive shaft 55 one end of which extends outside the housing 20 and is provided with coupling means 56 for connection to means such as an electric motor 57 (FIG. 1). Internally of the housing 20 there is secured to the shaft 55 a pinion 58 which meshes with a drive gear 59 mounted on and keyed to the spindle 40 by means of a keyway 60 or ball slot in the spindle 40 and bearing ball socket in gear 59 and keyway 60. The balls 61 in ball slot 6 allow longitudinal movement of the spindle 40 with a slight amount of rotations this arrangement being such as to transmit rotation of the motor to the spindle while permitting axial displacement of the spindle 40 with respect to the drive gear 59. Flange 41 acts as a spindle stroke stop to limit the overall length of the machined portion of rod 26b, cutter A and the chamfer by cutter B.

In operation, the spindle 40 and cutter cartridge assembly 42 being fully retracted to the position shown in FIG. 3 and the jaws of the clamshell workholder 23 being open, a workpiece such as a rod 26, is inserted between the jaws 24 and 25 until it engages the head 39 of the bolt 35 which acts as a work stop in this operation. The jaws 24 and 25 then are closed, motor rotation of the spindle 40 and assembly 42 is commenced, and the handwheel 53 is employed to bring the metal working tools on the assembly 42 into engagement with the workpiece; it being possible because of the greater axial travel of the metal working tools as compared with that possible with the structure disclosed in my patent aforesaid, to form extended portions of reduced diameter on the workpiece.

The above described embodiments of the present invention are merely descriptive of its principles and are not to be considered limiting. The scope of the present invention instead shall be determined form the scope of the following claims including their equivalents.

What is claimed is:

1. A tube an rod end shaping and finishing machine comprising:
   a housing;
   a tubular spindle rotatably mounted therein;
   a hollow cylindrical cutter cartridge assembly carried on one end of said spindle; said spindle and cutter cartridge assembly being mounted for axial movement with respect to said housing;
   a workpiece stop carried by said spindle and extending generally axially thereof through said hollow cylindrical cutter cartridge assembly when the latter is fully retracted;
   means for holding a workpiece positioned against said workstop in position for engagement by tooling carried by said cutter cartridge assembly;
   means for advancing and retracting said cutter cartridge assembly with respect to said workpiece stop and said holding means; and
   said cutter cartridge assembly including tooling engageable, upon such advancement, with a portion of an end of, and other tooling engagement with a portion of the periphery of, a workpiece held by said holding means.

2. A tube and rod end shaping and finishing machine according to claim 1 in which said means for advancing and retracting said cutter cartridge assembly includes a cylindrical rack carried by said spindle and a pinion rotatable on an axis normal to the axis of said spindle engaging said cylindrical rack in all rotational positions of said spindle.

3. A tube and rod end finishing machine comprising:
   a housing;
   a tubular spindle rotatably mounted therein;
   a cutter cartridge assembly carried on one end of said spindle; said spindle and cutter cartridge assembly being mounted for axial movement with respect to said housing;
   means carried by said housing for holding a workpiece in position for engagement by tooling carried by said cutter cartridge assembly; and
   means for advancing and retracting said spindle and cutter cartridge assembly with respect to a workpiece held by said holding means comprising a cylindrical rack carried by said spindle and a pinion rotatable on an axis normal to the axis of said spindle and engaging said cylindrical rack in all rotational positions of said spindle.

* * * * *

UNITED STATES PATENT AND TRADEMARK OFFICE
CERTIFICATE OF CORRECTION

PATENT NO. : 5,197,362
DATED : March 30, 1993
INVENTOR(S) : Orville J. Birkestrand It is certified that error appears in the above-identified patent and that said Letters Patent is hereby corrected as shown below:

Column 3, Line 9, change "6" to --60--.

Column 4, Line 15, change "engagement" to --engageable--.

Signed and Sealed this

Twenty-eighth Day of December, 1993

Attest:

BRUCE LEHMAN

Attesting Officer     Commissioner of Patents and Trademarks